US012230241B2

(12) United States Patent
Basu et al.

(10) Patent No.: US 12,230,241 B2
(45) Date of Patent: Feb. 18, 2025

(54) SYSTEM AND METHOD FOR SECONDARY PATH SWITCHING FOR ACTIVE NOISE CANCELLATION

(71) Applicant: Harman International Industries, Incorporated, Stamford, CT (US)

(72) Inventors: Sattwik Basu, Pittsburgh, PA (US); Kevin J. Bastyr, Franklin, MI (US); Jeffrey Charles Tackett, Allen Park, MI (US); David Trumpy, Novi, MI (US); Geon-Seok Kim, Novi, MI (US); Tao Feng, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 85 days.

(21) Appl. No.: 17/976,048

(22) Filed: Oct. 28, 2022

(65) Prior Publication Data

US 2024/0144905 A1 May 2, 2024

(51) Int. Cl.
*G10K 11/178* (2006.01)

(52) U.S. Cl.
CPC .. *G10K 11/17817* (2018.01); *G10K 11/17823* (2018.01); *G10K 11/17825* (2018.01);
(Continued)

(58) Field of Classification Search
CPC ..... G10K 11/17881; G10K 2210/1282; G10K 11/17817; G10K 11/17854;
(Continued)

(56) References Cited

U.S. PATENT DOCUMENTS 9,515,629 B2 12/2016 Goldstein et al.
9,923,550 B2 3/2018 Argyropoulos et al.
(Continued)

FOREIGN PATENT DOCUMENTS

EP 1577879 B1 9/2005
EP 2149875 A1 2/2010
(Continued)

OTHER PUBLICATIONS

Extended European Search Report dated Apr. 3, 2024 for European Patent Application No. 23204871.0, 10 pages.
(Continued)

*Primary Examiner* — Kile O Blair
(74) *Attorney, Agent, or Firm* — Brooks Kushman P.C.

(57) ABSTRACT

In at least one embodiment, an active noise cancellation (ANC) system is provided. An audio signal source provides an audio signal. At least one loudspeaker projects anti-noise sound within a cabin. At least one microphone provides a first error signal indicative of the noise, the audio signal, and the anti-noise sound and a second error signal indicative of an estimated anti-noise signal. At least one controller is programmed to receive the first error signal and the second error signal and to provide an estimated impulse response based at least on the first error signal and the second error signal. The at least one controller is further programmed to compare the estimated impulse response to one or more pre-stored impulse responses; and to select a first pre-stored impulse response that matches the estimated impulse response to filter one or more reference signals at an adaptive filter to generate the anti-noise signal.

22 Claims, 8 Drawing Sheets

(52) U.S. Cl.
CPC .................. *G10K 11/17881* (2018.01); *G10K 2210/12821* (2013.01); *G10K 2210/30232* (2013.01); *G10K 2210/3026* (2013.01); *G10K 2210/3027* (2013.01); *G10K 2210/3028* (2013.01); *G10K 2210/3044* (2013.01)

(58) Field of Classification Search
CPC ..... G10K 11/17857; G10K 2210/3022; G10K 2210/30232; G10K 2210/3033; G10K 2210/3055; H04R 2499/13
See application file for complete search history.

(56) References Cited

U.S. PATENT DOCUMENTS

| | | | | |
|---|---|---|---|---|
| 10,741,162 | B1 | 8/2020 | Bastyr | |
| 11,100,911 | B1 | 8/2021 | Jain | |
| 2005/0207585 | A1 | 9/2005 | Christoph | |
| 2010/0014685 | A1 | 1/2010 | Wurm | |
| 2010/0027805 | A1 * | 2/2010 | Itou .................. | G10K 11/17881 381/71.12 |
| 2010/0195844 | A1 * | 8/2010 | Christoph ........ | G10K 11/17817 381/71.11 |
| 2016/0163304 | A1 | 6/2016 | Lee et al. | |
| 2021/0304728 | A1 | 9/2021 | Wang et al. | |
| 2022/0238092 | A1 | 7/2022 | Inoue et al. | |

FOREIGN PATENT DOCUMENTS

| | | | |
|---|---|---|---|
| EP | 2216774 | A1 | 8/2010 |
| EP | 2996111 | A1 | 3/2016 |
| EP | 2996112 | A1 | 3/2016 |
| EP | 3761307 | A1 | 1/2021 |
| WO | 2022031279 | A1 | 2/2022 |

OTHER PUBLICATIONS

Extended European Search Report dated Mar. 4, 2024 for European Patent Application No. 23202397.8, 8 pages.

* cited by examiner

SYSTEM AND METHOD FOR SECONDARY PATH SWITCHING FOR ACTIVE NOISE CANCELLATION

CROSS-REFERENCE TO RELATED APPLICATIONS

This application generally relates to the U.S. application Ser. No. 17/975,782, filed Oct. 28, 2022, entitled "SYSTEM AND METHOD FOR ESTIMATING SECONDARY PATH IMPULSE RESPONSE FOR ACTIVE NOISE CANCELLATION" the disclosure of which is hereby incorporated in its entirety by reference herein.

TECHNICAL FIELD

Aspects disclosed herein generally relate to a system and method for secondary path switching for Active Noise Cancellation (ANC). These aspects and others will be discussed in more detail herein.

BACKGROUND

Active noise cancellation (ANC) systems attenuate undesired noise using feedforward and feedback structures to adaptively remove undesired noise within a listening environment, such as within a vehicle cabin. ANC systems cancel, or reduce, unwanted noise by generating cancellation sound waves to destructively interfere with the unwanted audible noise. ANC systems implemented on a vehicle that minimize noise inside the vehicle cabin include a Road Noise Cancellation (RNC) system, which minimizes unwanted road noise, and an Engine Order Cancellation (EOC) system, which minimizes undesirable engine noise inside the vehicle cabin.

Typically, ANC systems use digital signal processing and digital filtering techniques. For example, a noise sensor, such as a microphone an accelerometer or a revolutions per minute (RPM) sensor, outputs an electrical reference signal representing a disturbing noise signal generated by a noise source. This reference signal is fed to an adaptive filter. The filtered references signal is then supplied to an acoustic actuator, for example a loudspeaker, which generates a compensating sound field, which may ideally have an opposite phase and close to identical magnitude to the noise signal. This compensating sound field eliminates, or reduces, the noise signal within the listening environment.

The RNC system is a specific ANC system implemented on a vehicle to minimize undesirable road noise inside the vehicle cabin. RNC systems use vibration sensors to sense road induced vibration generated from the tire and road interface that leads to unwanted audible road noise. Cancelling such road noise results in a more pleasurable ride for vehicle passengers, and it enables vehicle manufacturers to use lightweight materials, thereby decreasing energy consumption and reducing emissions. The EOC system is a specific ANC system implemented on a vehicle to minimize undesirable engine noise inside the vehicle cabin. EOC systems use a non-acoustic sensor, such as an engine speed sensor, to generate a signal representative of the engine crankshaft rotational speed in revolutions-per-minute (RPM) as a reference. RNC systems are typically designed to cancel broadband signals, while EOC systems are designed and optimized to cancel narrowband signals, such as individual engine orders. ANC systems within a vehicle may provide both RNC and EOC technologies.

A residual noise signal may be measured, using a microphone, to provide an error signal to the adaptive filter's adaptation unit, where filter coefficients (also called parameters) of the adaptive filter are modified such that a norm of the error signal is produced. The adaptive filter's adaptation unit may use digital signal processing methods, such as least means square (LMS), filtered-x least mean square (FxLMS), modified filtered-x least mean square (MFxLMS) or other technique to reduce the error signal.

An estimated model that represents an acoustic transmission path from the loudspeaker to the microphone is used when applying many variants of the LMS algorithm, such as the FxLMS and MFxLMS algorithms. This acoustic transmission path is typically referred to as the secondary path of the ANC system. In contrast, the acoustic transmission path from the noise source to the microphone is typically referred to as the primary path of the ANC system. The secondary path transfer function represented in the time domain is often termed the impulse response, or IR.

The manner in which the estimated secondary path transfer function matches the actual secondary path transfer function, influences the stability of the ANC system. A varying secondary path transfer function can have a negative impact on the ANC system because the actual secondary path transfer function, when subjected to variations, no longer matches an "a priori" estimated secondary path transfer function that is used in the FxLMS or MFxLMS algorithm. The estimated model of the secondary path is typically measured once during the production tuning process and approximates the secondary path transfer function and during the production tuning process, the secondary path transfer function is estimated for a "nominal" acoustic scenario (i.e., one occupant, windows closed, seats in default positions). However, the secondary path can vary for many different reasons, like changes in occupancy count, seat positions, items in the listening environment. These differences between the stored, estimated secondary path and the actual secondary path may lead to inadequate noise cancellation system performance, or even to diverging adaptive filters, which causes undesirable noise being generated in the listening environment, often termed noise boosting.

SUMMARY

In at least one embodiment, an active noise cancellation (ANC) system is provided. An audio signal source provides an audio signal. At least one loudspeaker projects anti-noise sound within a cabin. At least one microphone provides a first error signal indicative of the noise, the audio signal, and the anti-noise sound and a second error signal indicative of an estimated anti-noise signal. At least one controller is programmed to receive the first error signal and the second error signal and to provide an estimated impulse response based at least on the first error signal and the second error signal. The at least one controller is further programmed to compare the estimated impulse response to one or more pre-stored impulse responses; and to select a first pre-stored impulse response that matches the estimated impulse response to filter one or more reference signals at an adaptive filter to generate the anti-noise signal.

In at least another embodiment, a method for performing active noise cancellation (ANC) system is provided. The method includes generating, an audio signal to transmit in a cabin of a vehicle with at least one audio signal source and transmitting an anti-noise sound in the cabin of the vehicle via at least one loudspeaker in response to receiving an anti-noise signal. The method further includes providing a first error signal indicative of the noise, the audio signal, and the anti-noise sound within the cabin and a second error signal indicative of an estimated anti-noise signal and receiving the first error signal and the second error signal by at least one controller. The method includes providing an estimated impulse response based on the first error signal and the second error signal and comparing the estimated impulse response to one or more pre-stored impulse responses. The method further includes selecting a first pre-stored impulse response that matches the estimated impulse response to filter one or more reference signals at an adaptive filter to generate the anti-noise signal.

In at least another embodiment, a computer-program product embodied in a non-transitory computer readable medium that is programmed for performing active noise cancellation (ANC) is provided. The computer-program product includes instructions for generating, an audio signal to transmit in a cabin of a vehicle with at least one audio signal source and transmitting an anti-noise sound in the cabin of the vehicle via at least one loudspeaker in response to receiving an anti-noise signal and providing a first error signal indicative of the noise, the audio signal, and the anti-noise sound within the cabin and a second error signal indicative of an estimated anti-noise signal. The computer-program product includes instructions for receiving the first error signal and the second error signal by at least one controller and providing an estimated impulse response based on the first error signal and the second error signal. The computer-program product includes comparing the estimated impulse response to one or more pre-stored impulse responses and selecting a first pre-stored impulse response that matches the estimated impulse response to filter one or more reference signals at an adaptive filter to generate the anti-noise signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Adaptive feedforward ANC algorithms such as engine order cancellation (EOC) and road noise cancellation (RNC) include a static estimate of a secondary path impulse response (IR) between loudspeakers and error microphones. In one example, the IR has been measured in a predetermined preproduction vehicle or vehicles to create one IR estimate that is stored in each of the large number of production vehicles that are produced. This, and the fact that the cabin configuration of any particular vehicle can change during runtime, can create a mismatch between the actual and stored secondary path IRs. This mismatch may lead to degraded noise cancellation performance, and in some cases, it may lead to undesirable noise boosting.

As described herein, the disclosed system and method intelligently update the static secondary path IR using an estimate of the actual cabin configuration to maintain noise cancellation performance. The estimated cabin configuration may be derived using a number of approaches which include generating test signals and measuring the response through the microphones or any other adaptive model of the cabin acoustics. The estimated IRs are processed by an IR matching algorithm such as a fingerprinting technique to obtain the closest match from a bank of pre-measured IRs. The disclosed system and method provide for determining if, when, and the manner in which secondary path IRs may be estimated and updated. Aspects disclosed herein, provides, among other things, a number of techniques for detecting changes in cabin acoustics and safely updating the static secondary path IRs to achieve better noise cancellation performance for multiple cabin acoustic configurations.

Figure 1:
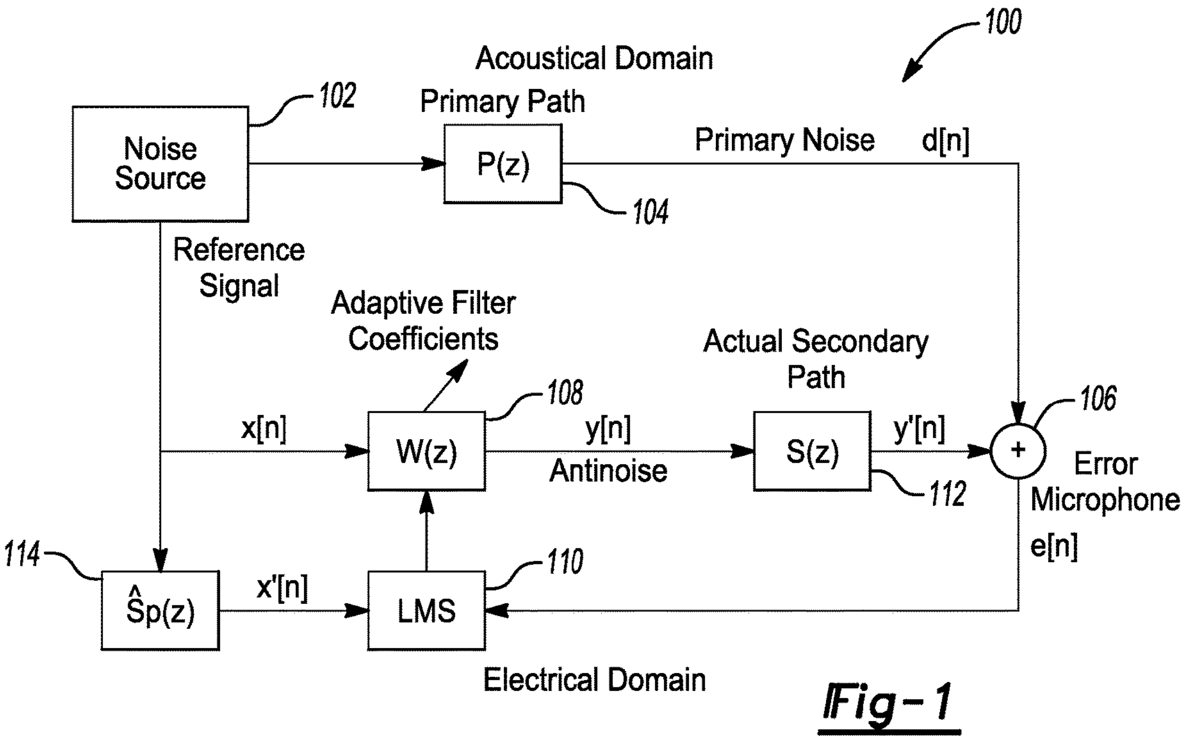
FIG. 1 generally depicts one example of an FxLMS Active Noise Cancellation (ANC) system.

FIG. 1 generally depicts one example of an Active Noise Cancellation (ANC) system 100. The ANC system 100 may be a Filtered-x Least Mean Squared (FxLMS) based ANC system. The system 100 includes a noise source 102 and a primary noise signal, d[n], that passes through an airborne or structure bourne transfer path 104 (or primary path) having a primary path transfer function, P(z) (or primary path 104). P(z) represents the transfer characteristics of a signal path between the noise source 102 and an error microphone 106. An adaptive filter 108 is a transfer function, W(z), having an adaptation unit 110 (or adaptive filter controller 110) that calculates a set of filter coefficients (also called parameters) for the adaptive filter 108. An actual secondary path (or transfer function) 112 is (or is characterized by the transfer function), S(z), downstream of the adaptive filter 108. The transfer function, S(z), represents the airborne and electrical signal path between a loudspeaker that radiates a compensation signal and a microphone position in the listening environment. An anti-noise signal, y'[n] includes the transfer characteristics of all components downstream of the adaptive filter 108, including, for example, amplifiers, digital-to-analog converters, loudspeakers, acoustic transmission paths, microphones, and analog-digital converters. An estimated secondary path system 114, has a modeled or measured transfer function $\hat{S}_p(z)$ that represents the actual secondary path transfer function S(z), and is used by the adaptation unit 110 to calculate the filter coefficients of the transfer function, W(z) for the adaptive filter 108. The primary path 104 and the actual secondary path 112 represent the physical properties of the listening environment. The transfer functions W(z), and $\hat{S}_p(z)$ are implemented in a digital signal processor.

The noise source 102 provides a signal to the primary path 104 which provides a disturbing noise signal, d[n], at the error microphone 106. The noise source 102 also provides a reference signal, x[n] to the adaptive filter 108, which imposes a phase and magnitude shift and outputs a filtered anti-noise signal y[n] to the actual secondary path transfer function 112 which outputs a signal, y'[n], that destructively interferes with the primary noise signal d[n] at the error microphone location. The reference signal, x[n], may be derived from a source that is correlated with the primary noise source 102, such as engine RPM or a microphone or accelerometer. A measurable residual signal represents an error signal, e[n], for the adaptation unit 110. The estimated secondary path transfer function $\hat{S}_p(z)$ is used to calculate updated filter coefficients. This compensates for decorrelation between the anti-noise signal y[n] and a filtered anti-noise signal, y'[n], due to the transfer function characterizing the secondary path. The secondary path transfer function $\hat{S}_p(z)$ also receives the reference signal, x[n], characterizing the noise source 102 and provides a filtered reference signal x'[n] to the adaptation unit 110.

The quality of the estimated secondary path transfer function $\hat{S}_p(z)$ influences the stability of the system 100. Deviation of the estimated secondary path transfer function $\hat{S}_p(z)$ from the actual secondary path transfer function S(z) affects convergence and stability behavior of the adaptation unit 110. Unstable behavior or suboptimal noise cancellation may be caused by changes in the ambient conditions in the listening environment, which lead to changes in the actual secondary path transfer function S(z). i.e., changes in the listening environment led to differences between $\hat{S}_p(z)$ and S(z). For example, when the listening environment is a vehicle cabin, changes in ambient conditions may occur when a window is opened, the seat positions are adjusted, or by the addition of items or passengers on one or more seats in the listening environment.

Figure 2:
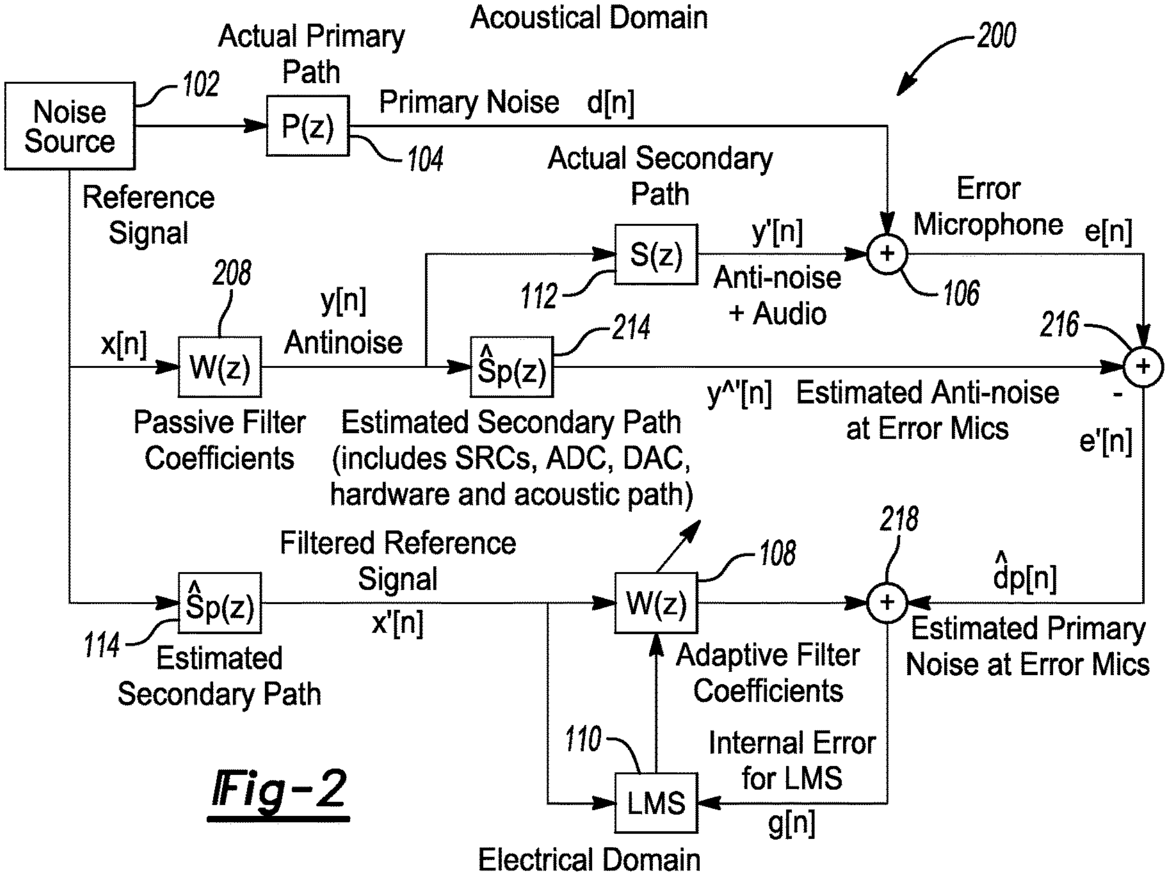
FIG. 2 generally depicts an example of an MFxLMS ANC system.

A second topology for a noise cancellation system is shown in block diagram FIG. 2, which is similar to the filter arrangement shown in FIG. 1 but includes an additional adaptive filter arrangement in parallel with the secondary path system. FIG. 2 is a modified filtered-x LMS (MFxLMS) feedforward noise cancellation system 200. The reference signal x[n] is filtered by the first estimated secondary path filter 114 with the adaptive filter 108 having transfer function W(z). Coefficients of the first estimated secondary path filter 114 are referred to as active filter coefficients. The dynamic system also includes a second adaptive filter 208 which filters the reference signal x[n] with a transfer function W(z) to generate the anti-noise signal y[n]. The anti-noise signal y[n] is filtered by the actual secondary path transfer function S(z) or 112. The signal y'[n] is audible anti-noise at the error microphone 106 as filtered by the actual secondary path transfer function S(z), 112. The filtered anti-noise signal y'[n] combines at the error microphone with primary noise d[n] as filtered by the actual primary path transfer function P(z) 104.

In the electrical domain, the anti-noise signal y[n] is filtered by a second secondary path transfer characteristic $\hat{S}_p(z)$ 214 and subtracted from the error signal, e[n], at adder 216 (or microphone). This results in an estimated noise signal, $\hat{d}_p[n]$, at the error microphone 106. The estimated noise signal $\hat{d}_p[n]$ is combined with the signal filtered by the first adaptive filter 108 at adder 218 to generate an internal error signal g[n]. The internal error signal g[n] is an input to the adaptation unit 110.

In practice, the secondary path estimate IRs are estimated only once for the listening environment with optimal conditions. For a vehicle cabin listening environment, this takes place only during the production tuning process before the vehicle leaves the production facility. Furthermore, the estimated secondary path IRs represent the listening environment in a nominal configuration. For example, when the listening environment is a vehicle cabin, a nominal configuration is the vehicle in park, not moving, with one driver, no other passengers, and all the windows, doors, sunroof and trunk fully closed.

The secondary path estimation process involves playing a test signal from each speaker to excite the electro-acoustic path followed by a deconvolution step. These secondary path estimates remain fixed thereafter for the lifetime of the vehicle. When the acoustic environment within the listening environment changes during runtime, for example when the vehicle is being driven with one or more windows partially open and multiple passengers or items in the seats, a mismatch between the actual and stored IRs results.

In a listening environment in real time, the stored IR for $\hat{S}_p(z)$ may differ from the actual IR of the secondary path, S(z), and this mismatch may eventually result in degraded ANC performance or in divergence of the W(z) filters, creating unbounded noise boosting within the passenger cabin. When $\hat{S}_p(z)$ better matches S(z), the resulting estimate of $\hat{d}_p[n]$ more accurately represents the primary noise signal that is present in the listening environment, and adaptive filters W(z) are much more likely to avoid divergence. Additionally, when $\hat{S}_p(z)$ better matches S(z), a more aggressive tuning approach may be used to increase the noise cancellation performance, because the risk of divergence has been reduced.

The system(s) and method(s) disclosed herein, may among other things, improve the accuracy of the stored estimates, replacing the stored estimates during system operation after calculating new secondary path IRs, online in real time in a near-imperceptible manner. These methods apply to FxLMS and MFxLMS systems described in FIGS. 1 and 2, respectively, and function to calculate $\hat{S}_p(z)$ parameters without the need for generating a test signal. In addition, it is also possible to find unique $\hat{S}_p(z)$ solutions under MIMO conditions and determine if, when, and how to change the $\hat{S}_p(z)$ parameters. In addition, the disclosed system(s) and method(s) calculate and update the stored estimates in a manner that is nearly imperceptible to the listener in the listening environment. Any updates that are made to the transfer function coefficients will be inaudible to a listener in the listening environment. The update is so slight, gradual, or subtle that it is not perceived by or affects the listener's senses making it go unnoticed.

With conventional implementation of ANC systems, the IRs for the $\hat{S}_p(z)$ are estimated only once during the production tuning process. In general, the IRs represent S(z) under a nominal cabin scenario (e.g., one driver, windows and doors closed, sunroof closed etc.) and remain fixed thereafter for the lifetime of the vehicle. The IR estimation process performed during the tuning process can involve playing test signals (e.g., broadband noise or sine sweeps) to excite and characterize an electro-acoustic path which is followed by a deconvolution step to determine the IR coefficients.

In general, once production tuning is complete (e.g., when the vehicle software is finalized and the vehicle has been sold and is being operated by customers), the IRs (S(z)) may differ from the estimated IRs ($\hat{S}_p(z)$) due to a variety of reasons. Such reasons may involve changes in occupancy, temperature, seat position or window position, etc. This mismatch may result in degraded ANC performance and may eventually result in divergence of the W(z) filters leading noise boosting. One strategy to mitigate the effects of divergence is to tune the ANC algorithm in a more conservative way. This may include setting tunable limiters on the anti-noise outputs or lowering a step-size of the ANC algorithm or increasing the leakage of the ANC system. However, such approaches may undesirably lead to reduced noise cancellation performance of the ANC system.

One approach to solve the S(z) to $\hat{S}_p(z)$ mismatch problem may include simply remeasuring IRs and loading parameters for the estimated secondary path $\hat{S}_p(z)$ with IRs that more closely match the actual secondary path S(z). Such an approach, however, may not be desirable, as this involves subjecting the customers seated in the vehicle to a suite of audible and unpleasant test signals for the entire life of the vehicle. If $\hat{S}_p(z)$ matches S(z) more closely, the resulting error feedback signal e[n] (or g[n]) represents the noise cancellation performance in the vehicle cabin more accurately. Under these conditions, the adaptive filters W(z) are then less likely to misadjust. In addition, with $\hat{S}_p(z)$ matching S(z) better, a more aggressive timing (resulting in better noise cancelation) can be used because there is lower risk of divergence.

There are several factors to consider when re-estimating and changing the $\hat{S}_p(z)$ IRs during runtime. For the disclosed system(s), the ANC system should include a method for re-estimating $\hat{S}_p(z)$ during normal vehicle operation (e.g., this will be referred to as updating $\hat{S}_p(z)$ with the value of $\hat{S}_{pu}(z)$). The measurement system for $\hat{S}_{pu}(z)$) may be embodied in various ways. This may include implementations such as:

- generating non-invasive, sub-audible sine sweeps or other test signals at a speaker output and measuring the response at the microphones to derive $\hat{S}_{pu}(z)$
- adaptive filters that use speaker outputs (e.g., audio, vehicle prompts, chimes) and microphone measurements to derive $\hat{S}_{pu}(z)$
- deep learning or system identification techniques that derives a $\hat{S}_{pu}(z)$ for some or all secondary paths, and/or
- by simply playing pink noise or a sine sweep from each speaker of interest in a manner that is audible to the passengers of the occupied vehicle or in a manner which is less disturbing to the occupants of the vehicle because the vehicle is unoccupied at the time of the test signal is being played. From these test signals received at the microphones of interest, it is possible to derive $\hat{S}_{pu}(z)$ using various methods.

With respect to the adaptive filters that are updated to estimate $\hat{S}_{pu}(z)$ such updates may also take place at least once and any time after the vehicle is purchased. One or more of the implementations as noted above may be implemented as, for example, a state machine which will be described in more detail in connection with FIG. 4.

Figure 3:
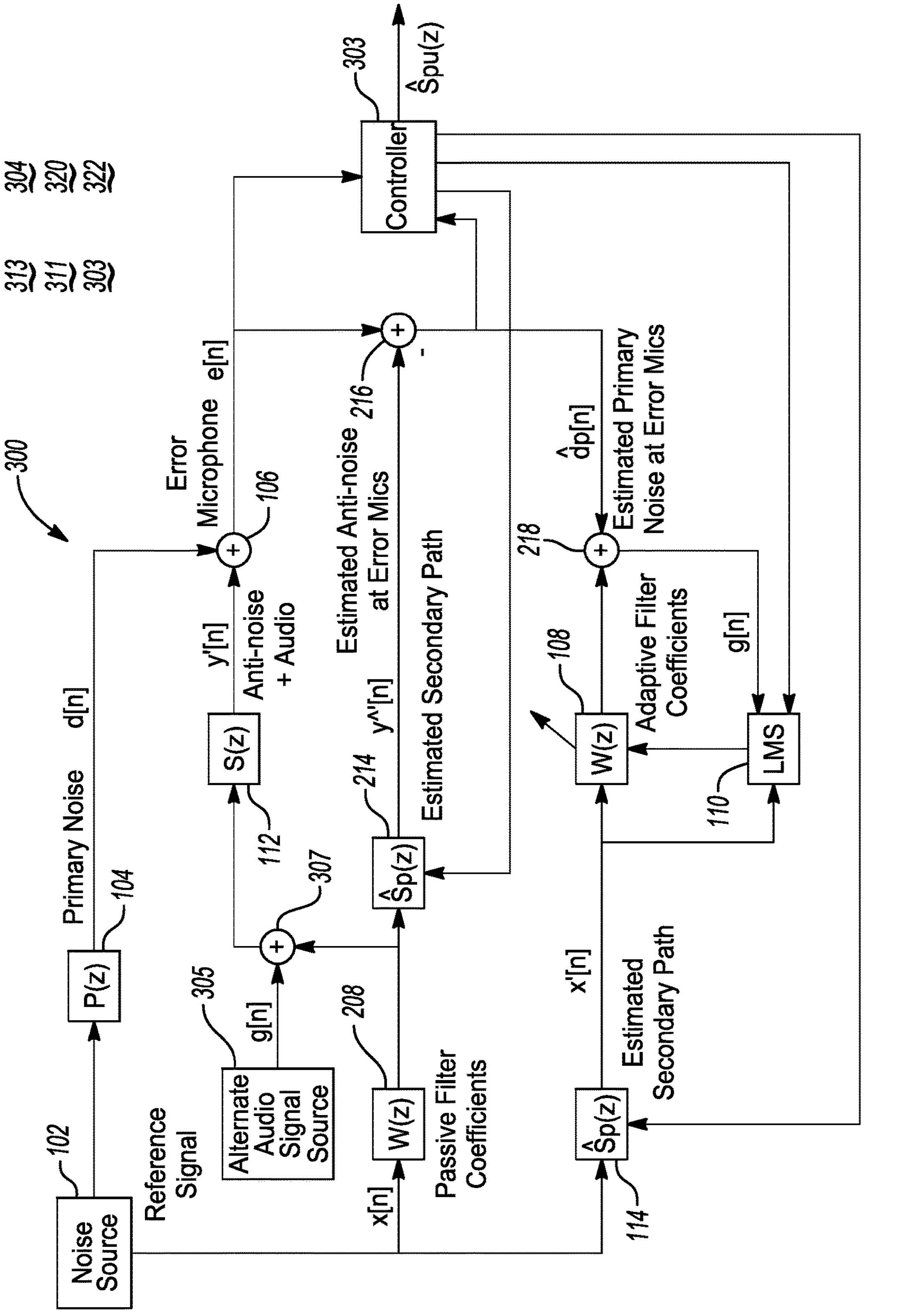
FIG. 3 generally depicts a system for performing secondary path switching using impulse response (IR) fingerprinting in accordance with one embodiment.

FIG. 3 generally depicts a system 300 for performing secondary path switching using impulse response (IR) fingerprinting in accordance with one embodiment. The system 300 includes at least one controller 303 (hereafter, the controller 303) and memory 304. The controller 303 is configured to perform a secondary path impulse response estimation to provide an estimate of the current value of $\hat{S}_{pu}(z)$. The system 300 includes at least one loudspeaker 311 (hereafter loudspeaker) that generates an anti-noise sound (e.g., in a cabin of a vehicle 313) in response to the anti-noise signal y[n]. The system 300 may utilize a number of the techniques disclosed herein to provide the estimate of the current value of $\hat{S}_{pu}(z)$. For any of these implementations or methods that provide the estimate of the current value of $\hat{S}_{pu}(z)$, the system 300 includes an alternate audio signal source 305 to provide an additional signal to each loudspeaker 311 of interest. The system 300 includes at least one loudspeaker 311 (hereafter loudspeaker) that generates an anti-noise sound (e.g., in a cabin of a vehicle 313) in response to the anti-noise signal y[n]. The signal e[n] or $\hat{d}_p[n]$ as received at each microphone 216 of interest provides a current value of $\hat{S}_{pu}(z)$ to the controller 303. In general, any 'in-situ' measurements or estimates of $\hat{S}_{pu}(z)$ as performed by the system 300 may include additional, unwanted noise that would not be present in the original, preproduction characterization of $\hat{S}(z)$. The presence of this additional noise may make this in-situ measurement of $\hat{S}_{pu}(z)$) a somewhat less accurate representation of the in-situ S(z) than the original, preproduction $\hat{S}_p(z)$ was of S(z) at the original time of measurement. These additional noise sources that are present at the time of measuring $\hat{S}_{pu}(z)$ include any one or more of engine noise, electric motor noise, wind noise, music noise, the noise of phone calls or conversation in the vehicle, HVAC noise, traffic noise, the noise of cityscape or noises of other nearby vehicles that invades the car cabin. It is the presence of these additional noises that make the fingerprinting of $\hat{S}_{pu}(z)$ (or the estimation of $\hat{S}_{pu}(z)$) necessary to produce optimal noise cancellation. One aim of the fingerprinting approach is to use the noisy $\hat{S}_{pu}(z)$ to select which of the predetermined, prestored, or measured $\hat{S}_p(z)$ with each selected $\hat{S}_p(z)$ corresponding to a different cabin configuration that best represents the current cabin configuration of the vehicle. As this measured set of $\hat{S}_p(z)$ may result in optimal noise cancellation and provide a stable system performance.

Figure 4:
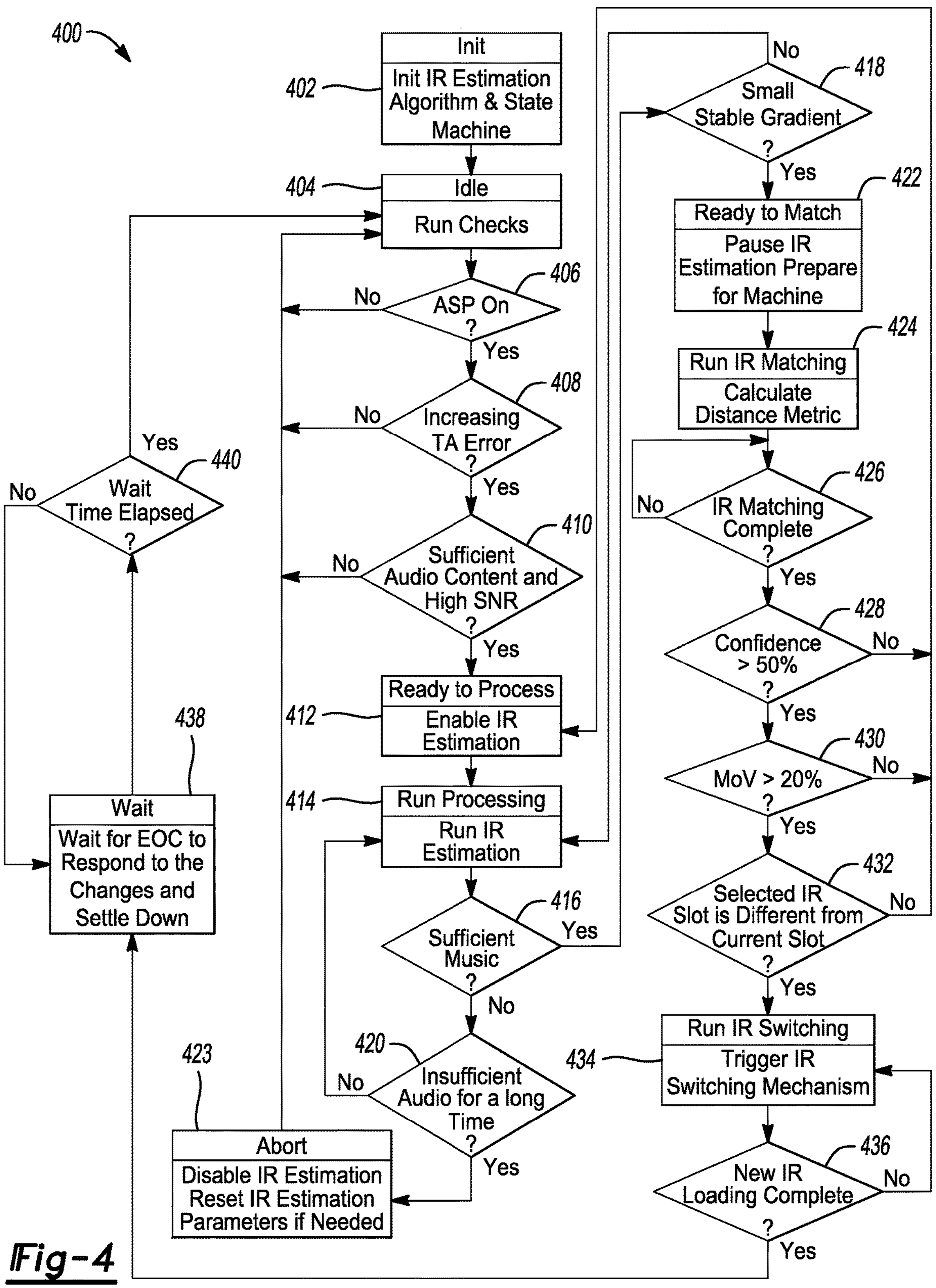
FIG. 4 generally depicts a state diagram (or method) for performing secondary path switching using IR fingerprinting in accordance with one embodiment.

FIG. 4 generally depicts a state diagram (or method) 400 for performing secondary path switching using IR fingerprinting in accordance with one embodiment. In state 402, the controller 303 sets the algorithm for performing secondary path switching, IR fingerprinting, and matching conditions to initial conditions. In operation 404, the controller 303 remains idle and runs checks. For example, the controller 303 may keep an estimate of the secondary acoustic transfer function $\hat{S}_{pu}(z)$ IR estimation algorithm (or secondary path IR re-estimation) inactive until predetermined conditions have been met. For example, in operation 404, the controller 303 may continuously monitor levels of various sets of signals as will be discussed in more detail below to determine when to enable or active the secondary path IR re-estimation algorithm. In addition to monitoring levels of various sets of signals, the controller 303 may also determine whether there is sufficient spectral content and signal to noise (SNR) in the audio signals. Once these conditions have been met, the method 400 proceed to 412. In an embodiment, one or more of these quality checks can be omitted. In an embodiment, a different quality check, such as confidence score may be obtained as set forth in operation 428, can alleviate the need for one or more conditions or quality checks. Operation 428 will be described in more detail below.

In operation 406, the controller 303 determines whether an Adaptive Secondary Path (ASP) is initialized. The ASP corresponds to a process for performing an online secondary path estimate in a multiple input/multiple output (MIMO) environment. If the ASP process can identify a closer match to the secondary path, this aspect may improve cancellation performance and that secondary path will be utilized.

If this condition is true, then the method 400 moves to operation 408. If not, then the method 400 moves back to operation 404. In operation 408, the controller 303 determines whether an increasing True Audio (TA) error has occurred. The TA error corresponds to a difference between the audio signal predicted to be at the error microphone 106 and the actual audio signal at the error microphone 106. If this difference is increasing, the TA error indicates that the model of the secondary path is inaccurate.

If this condition is true, then the method 400 moves to operation 410. If not, then the method 400 moves back to operation 404.

In operation 410, the controller 303 determines whether there is sufficient audio content present and also whether the SNR for the audio signal is above a predetermined level. For the characterization of $\hat{S}_{pu}(z)$ to be non-invasive, it is desired that the levels of any test signals be as low such that the test signals are as inaudible to passengers as possible. However, the level of the test signals needs to be high enough such that the test signals can be detected at the error microphones 106. This aspect provides a range of optimal amplitudes of the test signals. If this condition is true, then the method 400 moves to operation 412. If not, then the method 400 moves back to operation 404, as poor signal to noise ratio has rendered the test signals too noisy to be used to reliably estimate $\hat{S}_{pu}(z)$.

In operation 412, the controller 303 prepares for processing. In other words, the controller 303 activates the secondary path IR re-estimation algorithm. In operation 414, the controller 303 works toward identifying the present audio configuration in the vehicle (or cabin in the vehicle). The controller 303 continues to determine whether the audio content is sufficient in terms of spectral density and SNR in operation 416. In general, the adaptive filter 108 may only be adapted when the audio content is sufficiently flat over the required bandwidth. To accomplish this aspect, the system 300 and the method 400 may use spectral descriptors such as spectral flatness to determine if the audio content will allow proper convergence of the adaptive filters.

With respect to SNR levels of the error microphones 106 in the vehicle, if background noise in the vehicle is much higher than the audio playing in the car, such noises may dominate estimation for the adaptive filter (or the secondary path estimation $\hat{S}_{pu}(z)$) Thus, with this scenario, if audio is below the background noise of the vehicle, such a condition may indicate that secondary path estimation $\hat{S}_{pu}(z)$ is unreliable. In addition, with respect to the error levels on the microphones 106, the overall levels in the microphone (e.g., ANC microphones) may also be used to determine whether the estimated secondary path $\hat{S}_{pu}(z)$ is reliable. For example, if the microphone exhibits a consistently low amplitude, such a condition may indicate that the estimated secondary path $\hat{S}_{pu}(z)$ is not yet reliable. If the controller 303 determines that the audio content is sufficient in terms of spectral density and SNR, the method 400 moves to operation 418. If not, then the method 400 moves to operation 420.

In operation 420, the controller 303 determines whether there is an insufficient amount of audio being received that exceeds a predetermined amount of time. If this condition is true, then the method 400 moves to operation 424 and aborts. If not, the method 400 moves back to operation 414. Also in operation 414, the controller 303 monitors one or more signals from the secondary path IR re-estimation algorithm to determine whether convergence has been achieved. In general, the error microphone 106 provides an output which indicates that $\hat{S}_{pu}(z)$ has converged to an acceptable error to S(z). Additionally or alternatively, signals derived from this error such as a gradient value from an adaptive filter using a gradient descent method may perform an online estimate of $\hat{S}_{pu}(z)$.

In operation 418, the controller 303 determines whether the audio content is exhibiting a small stable gradient. For example, the controller 303 may compare a gradient on the audio content to a predetermined gradient value. A high gradient in the system 300 may indicate that the filters for the estimated secondary path (e.g., $\hat{S}_{pu}(z)$) have not converged on the IRs on the actual secondary path S(z). Since the gradient is usually a vector quantity, an $L_2$ norm may be used to determine a convergence of the estimated secondary path, (e.g., $\hat{S}_{pu}(z)$) filters (or convergence of the adaptive filters). When the $L_2$ norm is consistently low (or below the predetermined gradient value), this may be indicative of the estimated secondary path, $\hat{S}_{pu}(z)$ being reliable. Thus, if this condition is true (e.g., gradient of the audio content is less than the predetermined gradient value), then the method 400 moves to operation 422. If not (e.g., gradient of the audio content is greater than the predetermined gradient value), then the method 400 moves back to operation 414.

In general, it may be desirable to ensure that the secondary path estimation $\hat{S}_{pu}(z)$ is reliable and can be used to update the secondary acoustic transfer function, S(z) with the secondary path estimation $\hat{S}_{pu}(z)$ such that the adaptation unit 110 can use the secondary path estimation $\hat{S}_{pu}(z)$ to calculate the filter coefficients of the transfer function, W(z) for the adaptive filter 108. In general, while the system 300 may reliably generate $\hat{S}_{pu}(z)$, this may not entail that the secondary path estimation of $\hat{S}_{pu}(z)$ results in robust or reliable fingerprints. The system 300 is configured for a default $\hat{S}_{pu}(z)$ when the system 300 starts up or may utilize the last determined $\hat{S}_{pu}(z)$ during the last operation of the vehicle 313. The possible candidates for $\hat{S}_{pu}(z)$ are determined based on selection that may minimize performance degradation in the maximum number of likely cabin configurations. The controller 303 also includes instructions for executing an adaptive filter (or deep learning, or system identification algorithm) that iteratively solves for the secondary path based on the reference component of the signal output from microphone 307 and the receipt of that signal through the actual S(z) 112 by all error microphones 106.

There may be a number of reasons as to why the $\hat{S}_{pu}(z)$ may not be reliable. For example, if the estimated secondary path estimation $\hat{S}_{pu}(z)$ was obtained by the adaptive filter of the controller 303, the adaptive filter may have misadjusted due to a variety of reasons or include coefficients whose values approach infinity (or provides a divergent filter). Conversely, if the secondary path estimation $\hat{S}_{pu}(z)$ was obtained by deep learning or system identification, then the estimate may not be accurate if the system was not trained and tested with as many real-world acoustic combinations as possible. Therefore, it is generally desirable to assess the reliability of $\hat{S}_{pu}(z)$ coefficients before such coefficients may be used for fingerprinting and updating the coefficients of $\hat{S}_{pu}(z)$.

A high error in system 300 may indicate that the filter for the estimated secondary path, $\hat{S}_{pu}(z)$ are diverging from the actual IRs for the secondary path S(z). A large error may indicate that convergence has not occurred thus causing $\hat{S}_{pu}(z)$ to be unreliable. Therefore, to implement this, the state machine (or the method 400) may compare the current error to a tunable threshold and if the error is below the threshold, then the method 400 may conclude that, for this metric, the $\hat{S}_{pu}(z)$ is reliable. In general, the controller 303 monitors the error output by the microphone 216.

Generally, since the secondary path estimation $\hat{S}_{pu}(z)$ may be estimated using one or more of these methods, the exact process for validating the secondary path estimation $\hat{S}_{pu}(z)$ may vary. The method 400 provides an approach that uses many possible processes that are useful for validating the secondary path estimation $\hat{S}_{pu}(z)$ based on adaptive system identification. Any combination of these techniques below could be used. An example of this can be seen in the method 400 between operations 404 (e.g., IDLE) and 414 (e.g., Run IR Estimation) also including operations 406, 408, 410, 416, 418, and 420.

In operation 422, the controller 303 disables or deactivates the secondary path IR re-estimation algorithm and initializes IR fingerprinting and matching process.

In operation 424, the controller 303 activates or triggers a matching algorithm to performing IR fingerprinting. The fingerprints of one or more IRs are derived in this operation. In general, the method 400 and the system 300 provides, for example, fingerprinting IRs to dynamically switch secondary path parameters in an online single input, single output (SISO) or MIMO ANC system, despite FIG. 1 and FIG. 2 showing a simplified schematic of the SISO ANC system. Fingerprinting involves, among other things, applying signal processing techniques to extract a unique signature from at least one, or every estimated impulse response $\hat{S}_{pu}(z)$ in the system 300. Every IR in a multi-channel ANC system displays unique attributes about an electroacoustic path. These attributes account for signal processing components such as analog to digital (A/D) and digital to analog (D/A) converters, amplifiers, loudspeakers, microphones, and the acoustic path itself. The response of the electroacoustic path (i.e., the frequency response of the electroacoustic path), is affected to a greater degree by the acoustic properties of the vehicle cabin. For a typical vehicle cabin, the frequency response shows peaks and dips at various frequencies. In addition, the peaks and dips can shift in amplitude and frequency depending on a variety of factors such as temperature, seating configuration, number of vehicle occupants and so on. It is these variations in the frequency response that enable the opportunity to extract unique fingerprints from the IRs.

The pre-measured bank of IRs from the various configurations of the vehicle's cabin can be obtained either from a production vehicle IR measurement or from a different secondary path estimation, $\hat{S}_{pu}(z)$ estimation technique. Another approach may involve using the secondary path estimation $\hat{S}_{pu}(z)$ estimation algorithm itself to derive the pre-measured bank of IRs from the various acoustic cabin configuration. In addition, the controller 303 may assign each cabin acoustic configuration in this bank to a tag (bank1, bank2, etc.) or through the use of a lookup table (LUT) 320. The pre-measured bank of IRs may be stored in memory 322 (or the LUT 320) the associated with the controller 303 as pre-stored IRs for comparison to one or more of the estimated impulse responses $\hat{S}_{pu}(z)$.

IRs measured in a production vehicle can yield more accurate fingerprints for multiple cabin configurations, because it uses a test signal to excite all frequencies. Another approach would be to use the $\hat{S}_{pu}(z)$ IR estimation algorithm itself to derive the IRs from the various acoustic combinations. Finally, each cabin acoustic configuration in this bank is assigned a tag (bank1, bank2, and so on.).

Once all the fingerprint characteristics have been extracted from the estimated $\hat{S}_{pu}(z)$ IR, the system 300 and method 400 may match the estimated secondary path $\hat{S}_{pu}(z)$ with an existing database of fingerprints (or predetermined (or pre-stored) secondary path estimations) from various cabin configurations is applied to find the closest match. Finally, the IR coefficients from the closest matching configuration are loaded by the adaptation unit 110 into the adaptive filter of the system 300. The system 300 performs the above method of estimating the impulse response and determining if there is a match to a prestored impulse response for every loudspeaker and microphone pair in the vehicle.

The matching process as executed by system 300 may involve the controller 303 calculating a distance metric, ascertaining a winner (e.g., the closest matched IR value to the pre-stored IR), a confidence level of the match between the closest matched IR value in the estimated secondary path $\hat{S}_{pu}(z)$ to various pre-stored IR values, and determining a margin of victory (MOV) between the closest matched IR value to a plurality of the pre-stored IRs.

In operation 424, the controller 303 calculates the distance metric to determines the closest match between the secondary path estimate IR, $\hat{S}_{pu}(z)$, and the bank of previously stored IRs. Examples of distance metrics may include Euclidean norm, $L_p$ norms or their variations such as, for example, the Hausdorff distance and normalized misalignment. The distance metric will be discussed in more detail in connection with FIG. 6.

In operation 426, the controller 303 determines whether the matching is complete. For example, the controller 303 establishes a voting matrix of the closest matched IR value relative to the closest previously stored IRs as stored in memory. If this condition is true (e.g., the voting matrix has been established), then the method 400 moves to operation 428. If not, then the method 400 moves back to operation 424.

In operation 428, the controller 303 establishes a confidence metric to determine a final winning IR configuration by considering aspects of the voting matrix. This will also be discussed in more detail in connection with FIG. 6. The controller 303 determines whether the IR candidate exhibits a confidence level of that is greater than a predetermined value (e.g., 50%). If this condition is met, then the method 400 moves to operation 432. If not, then the method 400 moves back to operation 412.

In operation 430, the controller 303 determines a margin of victory (MOV) between the IR value for the secondary path estimate $\hat{S}_{pu}(z)$ and the closest IR value in the bank and the second closest IR value in the bank. The controller 303 determines whether the MOV is above a predetermined MOV threshold (e.g., 20%). If the MOV is above the predetermined MOV threshold, then the method 400 moves to operation 432. If not, then the method 400 moves back to operation 412.

In operation 432, the controller 303 determines if the selected IR slot is different from the current slot. If the selected IR slot is identical to the current IR slot, then the best-fit IR is currently in use by the ANC system 300, and there is no need to change to a different IR. If this condition is true, then the method 400 moves to operation 434 to perform the IR switching. If not, then the method 400 moves back to operation 412. In operation 434, the controller 303 executes or performs IR switching. For example, the controller 303 executes a trigger IR switching mechanism. In this case, the controller 303 executes the IR switching mechanism to start transitioning from the old $\hat{S}_p(z)$ parameters with the new parameters that matched the $\hat{S}_{pu}(z)$ measurement. An abrupt switch may momentarily degrade ANC performance but is also possible. To avoid this condition, the IR switching mechanism includes a smooth slewing approach to minimize any audible artifacts. A time constant for slewing may be tunable or variable but could be in the range of, for example, 100 ms to several seconds to complete. Another embodiment may include instantaneously updating the IR for the secondary estimation path with the $\hat{S}_{pu}(z)$ coefficients for the adaptive filter 108. It is generally recognized that one aspect may involve utilizing the new parameters that matched the that matched the $\hat{S}_{pu}(z)$ measurement, not the parameters that that correspond to the impulse response measurement (or $\hat{S}_{pu}(z)$ measurement).

In general, the controller 303 may perform one of the following options when executing the IR switching mechanism. In a first option, the controller 303 updates all coefficients of the adaptive filter 108 via the adaptation unit 110. For example, the LMS parameters of step size and leakage may be temporarily modified so that when the unintended transient occurs, the adaptive filters 108 of the ANC system may not respond. In a second option, the controller 303 performs a slewed (average) update of all of the coefficients of the adaptive filter 108 via the adaptation unit 110 over a short period of time. In this case, the coefficients are gradually updated using, for example, an averaging filter to blend coefficients from the current value of the secondary path estimation $\hat{S}_{pu}(z)$ to new targeted coefficient values for the secondary path estimation $\hat{S}_{pu}(z)$. Averaging may either be linear or exponential and the total update time may be tunable (e.g., total update time range may be 40 ms to 5 seconds).

In operation 436, the controller 303 determines whether coefficients provided by the adaptation unit 110 to the adaptive filter 108 have been loaded properly. For example, the controller 303 monitors the state of the ANC after the switch has occurred in operation 434. If the proper coefficients have been property loaded, then the method 400 moves to operation 438. If not, then the method 400 moves back to operation 434.

In operation 438, the controller 303 executes a WAIT state. For example, the controller 303 determines whether the selected IR (or new IR) is stable. In general, after the update is complete, the controller 303 monitors the effects of the newly updated parameters. If the controller 303 detects divergence or the error signals with these new IRs from the newly measured $\hat{S}_{pu}(z)$ seem excessively high or are higher than with the previous $\hat{S}_{pu}(z)$ from immediately prior to the coefficient swap, the controller 303 could quickly revert to the previous parameters as such parameters are stored and not deleted. But if no issues are detected, then the controller 303 may keep the estimated coefficients for the adaptive filter 108 based on the estimated $\hat{S}_{pu}(z)$ frozen for a longer period of time (ex. 5-30 minutes) before resuming the IR estimation algorithm and repeating the same logic described above for deciding if, when, and how to update $\hat{S}_{pu}(z)$ again. This process may keep running for the entire duration of a vehicle ignition cycle. If the selected IR (or estimated secondary path $\hat{S}_{pu}(z)$) is stable, then the method 400 moves to operation 440. If not, then the method 400 moves to back to operation 434. In operation 440, the controller 303 determines if a timer for the WAIT state has expired. The controller 303 employs the timer and waits for the timer to expire to determine if the state of the selected IR (or new IR) is stable. If the state of the selected IR is stable after the time expires, the method 400 moves to operation 404. If not, then the method 400 moves back to operation 438.

In general, aspects disclosed herein provide for a distance measurement (or misalignment) which is defined by an $L_2$ Normalized Square Error between an estimated IR, $\hat{S}_{pu}(z)$ and an actual IR, $S_p(z)$. This may be defined mathematically by the following equation:

Norm (Sp(z)−Ŝpu(z))/Norm (Sp(z)), which may then be converted to a logarithmic scale. It is recognized that the disclosed system may also perform the above equation in a time domain. This is generally referred to as a relative modeling error. One example of this relative modeling error is generally set forth in "A New Online Secondary Path Modeling Method with An Auxiliary Noise Power Scheduling Strategy for Narrowband Active Noise Control Systems", Sun et al., 29 Nov. 2017 which is hereby incorporated by reference in its entirety. The controller 303 provides a vector of distances between the various IRs, $\hat{S}_{pu}(z)$ and the stored IRs in a distance matrix.

Figure 5:
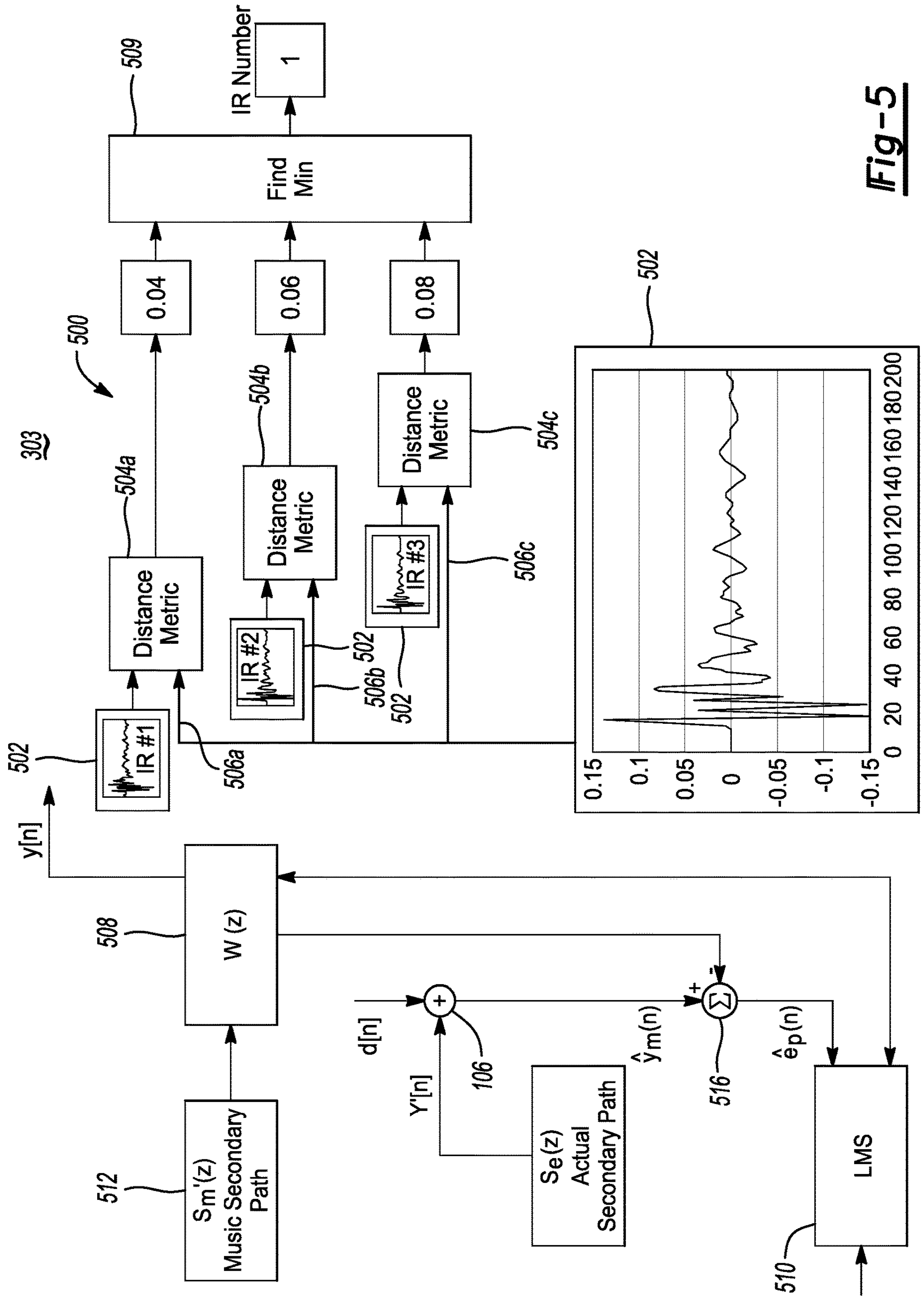
FIG. 5 generally illustrates a system for performing IR matching in accordance with one embodiment.

FIG. 5 generally illustrates a portion of a system 500 for performing IR matching in accordance with one embodiment. The system 500 includes the error microphone 106, an adaptive filter 508, an adaptation unit (or LMS) 510, and an adder 516 (or error microphone). The error microphone 106 receives the primary noise d[n] and the anti-noise signal y'[n] (or the anti-noise output filtered through the transfer function S(z)) and generates a $\hat{y}_m(n)$ which corresponds to the error signal with the audio signal (as provided by an audio source) that LMS 510 will adapt the adaptive filter 508 to remove $\hat{S}_m(z)$ 512. The adder 516 receives a music signal filtered by the estimated music secondary path $\hat{S}_m(z)$ 512, and the $\hat{y}_m[n]$ signal. The adder 516 provides $\hat{e}_p[n]$ to the adaptation unit 510, which is an estimate of the combined noise and anti-noise with the music signal adaptively removed by the combination of the adaptive filter 510 and $\hat{S}_m(z)$ 512. For example, the adaptation unit 510 adapts the music secondary path $\hat{S}_m(z)$ 512 via the adaptive filter 508 to remove the music component of the signal from $\hat{y}_m[n]$ at the adder 516. The controller 303 provides an estimated IR as generally shown at 502 and executes distance metrics **504*a*-504*c* which compares the estimated IR 504 against three different prestored (or banked) IR values 506*a*-506*c***.

In an embodiment, the controller 303 repeats this operation for every loudspeaker and microphone combination in the audio system. The distance metric is generally defined as a machine learning algorithm that is used to calculate the similarity between data point. The distance metric may calculate the distance between points and then define the similarity between such points. The distance metrics **504*a*-504*c* output values 0.04, 0.06, and 0.08, respectively. A minimum circuit 509 receives the outputs from the metrics 504*a*-504*c* and obtains the minimum value. Thus, the minimum circuit 509 selects the minimum value of 0.04 as output from the distance metric 504*a*. The controller 303 establishes a vote for the speaker and microphone combination (e.g., the prestored IR value 506*a*) that provides the value of 0.04. In other words, the controller 303 provides a vote for the first prestored IR value 506*a* from the bank of IR values 506*a*-506*c*. In various embodiments, this matching process can be done on as few as one IR, and as many as all the IRs in the system 500**.

Figure 6:
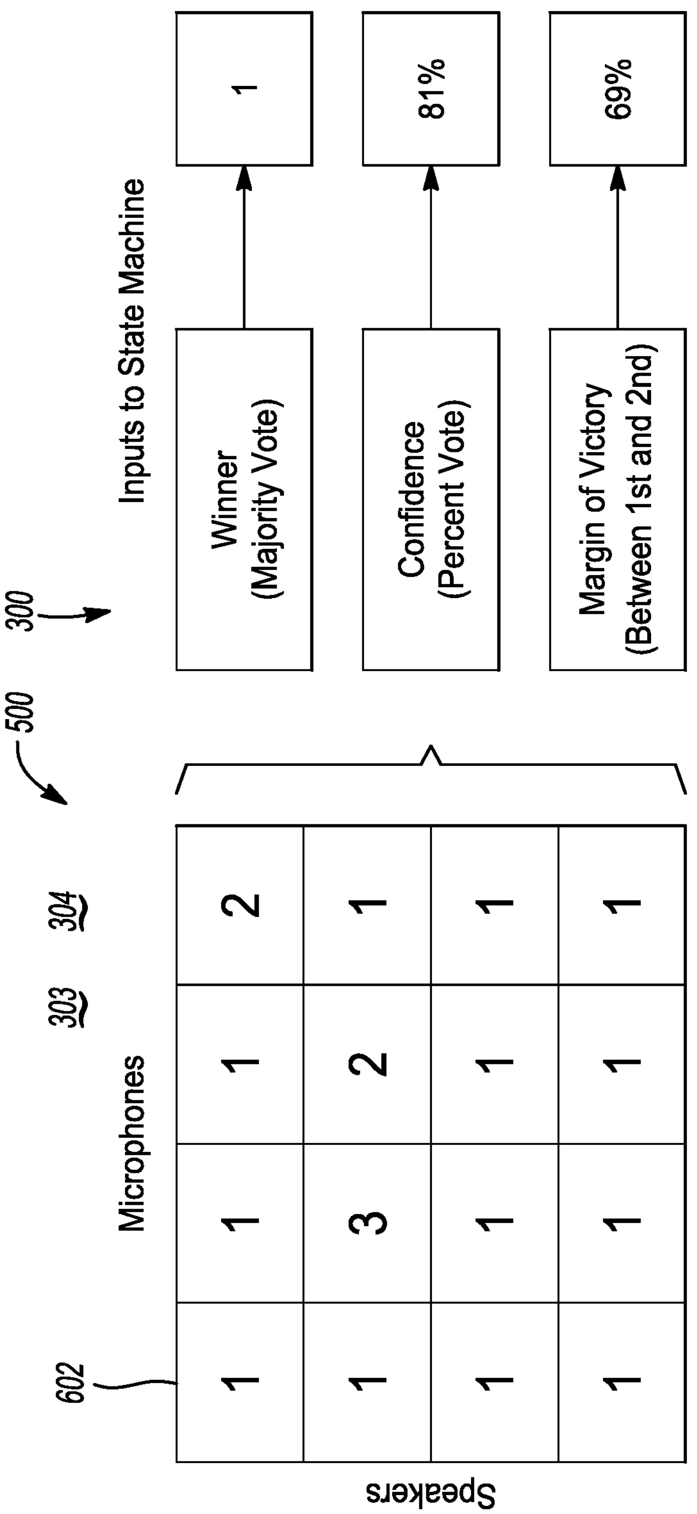
FIG. 6 generally illustrates an example of voting to select a desired IR as performed by the system of FIGS. 3 and 5.

FIG. 6 generally illustrates an example of voting to select a desired IR (or prestored IR) as performed by the system 300 of FIG. 3. The controller 303 stores data corresponding to a voting matrix 602 in the memory 304 positioned anywhere within the system 300. The voting matrix 602 generally corresponds to the number of loudspeakers positioned along rows of the matrix 602 and a number of microphones positioned along columns of the matrix 602. Elements 506*a* as shown in FIG. 5 may represent a matched impulse response of "1" in the matrix 602. Elements 506*b* as shown in FIG. 5 may represent a matched impulse response of "2" in the matrix 602. Elements 506*c* as shown in FIG. 5 may represent a matched impulse response of "3" in the matrix 602. The matrix 602 illustrates in almost every instance for each microphone-loudspeaker pair, that the prestored IR value of "1" (or element 506*a*) has the majority of votes.

The controller 303 also determines a confidence metric. The controller 303 uses the confidence metric to determine the final winning IR configuration by considering aspects of the voting matrix 602. The equation for the confidence metric for bank-n is provided below:

$$\text{Confidence}_n = \frac{\text{Number of Votes}_n}{\text{Total Number of Votes}} \times 100\%$$

In reference to FIG. 6, the first IR configuration (or the prestored IR value of "1") receives 13 out of the 16 votes resulting in a confidence of 81.25%. Thus, the prestored IR value of "1" is selected by the controller 303 to be the selected IR configuration for this test case. As noted above, the controller 303 determines MOV between the closest matched IR value to a plurality of the pre-stored IRs. The MOV is generally defined as a difference between the selected scenario (e.g., the prestored or banked IR value of "1") and the second place. In the example above, the prestored IF value 506*b* receives 2 out of 16 votes i.e., 12.5%. In this case, the margin of victory equals 81.25% (e.g., the confidence)−12.5% (percentage of votes)=68.75%. In general, the confidence and the MOV may be used as tunable parameters in the system 300. Such tuned values may represent threshold that the method 400 may utilize for determining whether to switch IRs. In some instances, the votes may be weighted (see FIG. 8) to account for loudspeaker and microphone combinations that are considered more relevant or have a higher priority after the IRs are measured during the tuning stage.

Once the controller 303 determines which of the prestored IR values to utilize, it is generally required to update to the filter coefficients of the adaptive filter 108 (e.g., via the adaptation block 110) in a manner that is imperceptible to end users. Updating filter coefficients abruptly may, in some instances, generate an unintended transient response inside the adaptive filter 108 because immediately after the update, the next output sample (e.g., usually denoted as y[n]) can vary greatly from the previous output (y[n−1]). This may be the case for any Infinite Impulse Response (IIR) filters are used to model the estimated secondary path $\hat{S}_{pu}(z)$. Depending on ANC tuning, this unintended transient may be viewed as a large error in the adaptive filter 108 (e.g., or the adaptation unit 110) and may try to overcompensate resulting in a brief burst of anti-noise which could be perceived by the occupants of the vehicle.

Given these concerns, the system 300 may employ two options to update secondary estimated path $\hat{S}_{pu}(z)$. In a first option, the controller 303 updates all coefficients of the adaptive filter 108 via the adaptation unit 110. For example, the LMS parameters of step size and leakage may be temporarily modified so that when the unintended transient occurs, the adaptive filters 108 of the ANC system may not respond. In a second option, the controller 303 performs a skewed (average) update of all of the coefficients of the adaptive filter 108 via the adaptation unit 110 over a short period of time. In this case, the coefficients are gradually updated using, for example, an averaging filter to blend coefficients from the current value of the secondary path estimation $\hat{S}_{pu}(z)$ to new targeted coefficient values for the secondary path estimation $\hat{S}_{pu}(z)$. Averaging may either be linear or exponential and the total update time may be tunable (e.g., total update time range may be 40 ms to 5 seconds).

Figure 7:
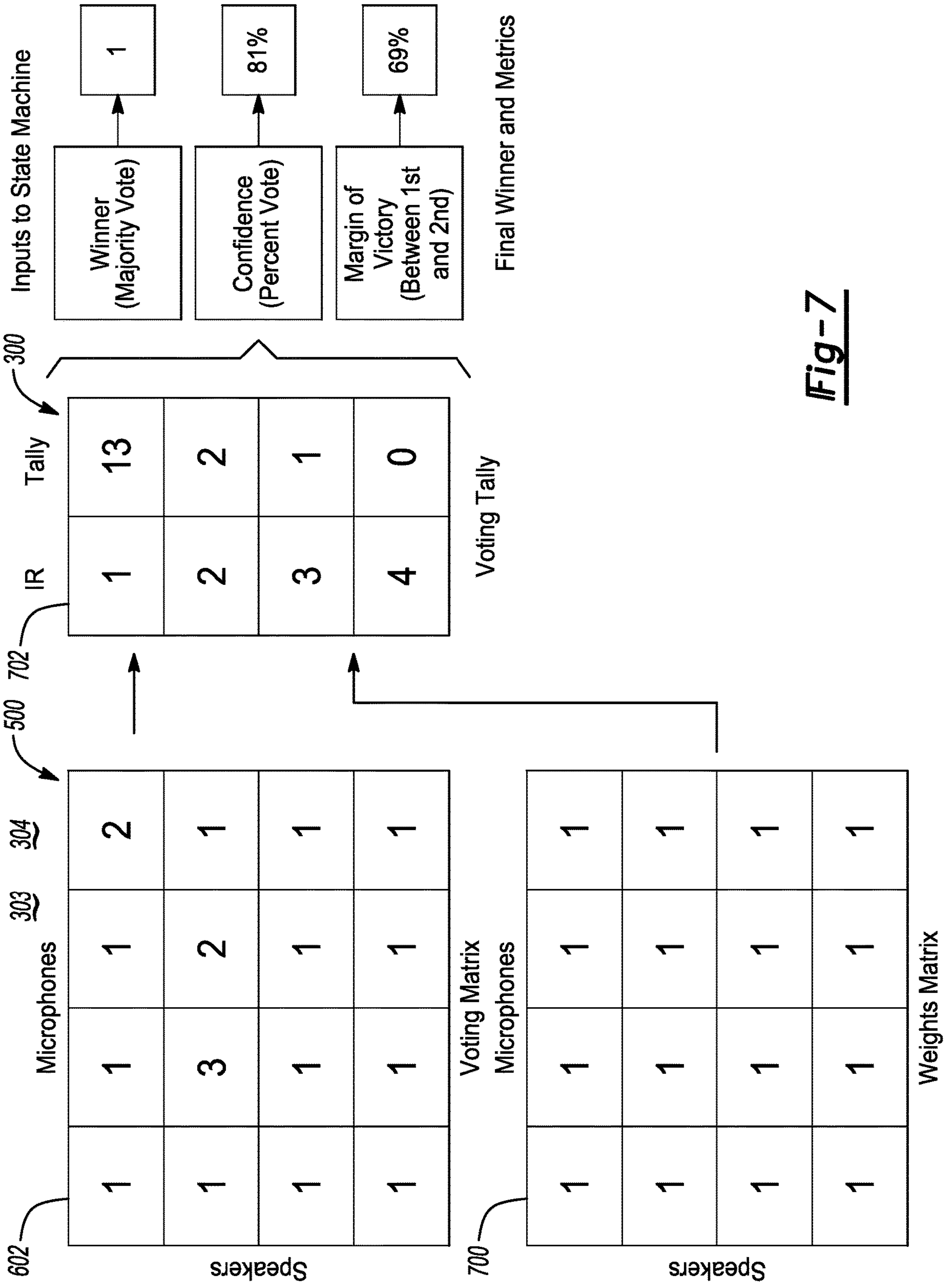
FIG. 7 generally illustrates the example of FIG. 6 where a unity matrix (non-weighted matrix) is applied to select the desired IR as performed by the system of FIGS. 3 and 5.

FIG. 7 generally illustrates the example of FIG. 6 where the controller 303 applies a unity matrix (non-weighted matrix) 700 is applied to select the desired IR as performed by the system of FIGS. 3 and 5. The non-weighted matrix 700 is multiplied with the to the various IRs as designated by 1, 2, and 3 in the voting matrix 602. The non-weighted matrix 800 includes values that are weighted at the same value (e.g., 1). Element 702 illustrates a voting tally whereby IRs designated by "1" are tallied 13 times in the voting matrix 602, IRs designated by "2" are tallied "2" times in the voting matrix 602, and IRs designated by "3" are tallied "0" times in the voting matrix 602. In this regard, the margin of victory is similar that discussed in connection FIG. 6. Similarly, the controller 303 selects the IRs designated by "1" as the winner (or selected IR) as such an IR has a confidence (or percent vote) of 81% and the margin of victory of IR "1" is 69% over the IRs of "2" and "3".

Figure 8:
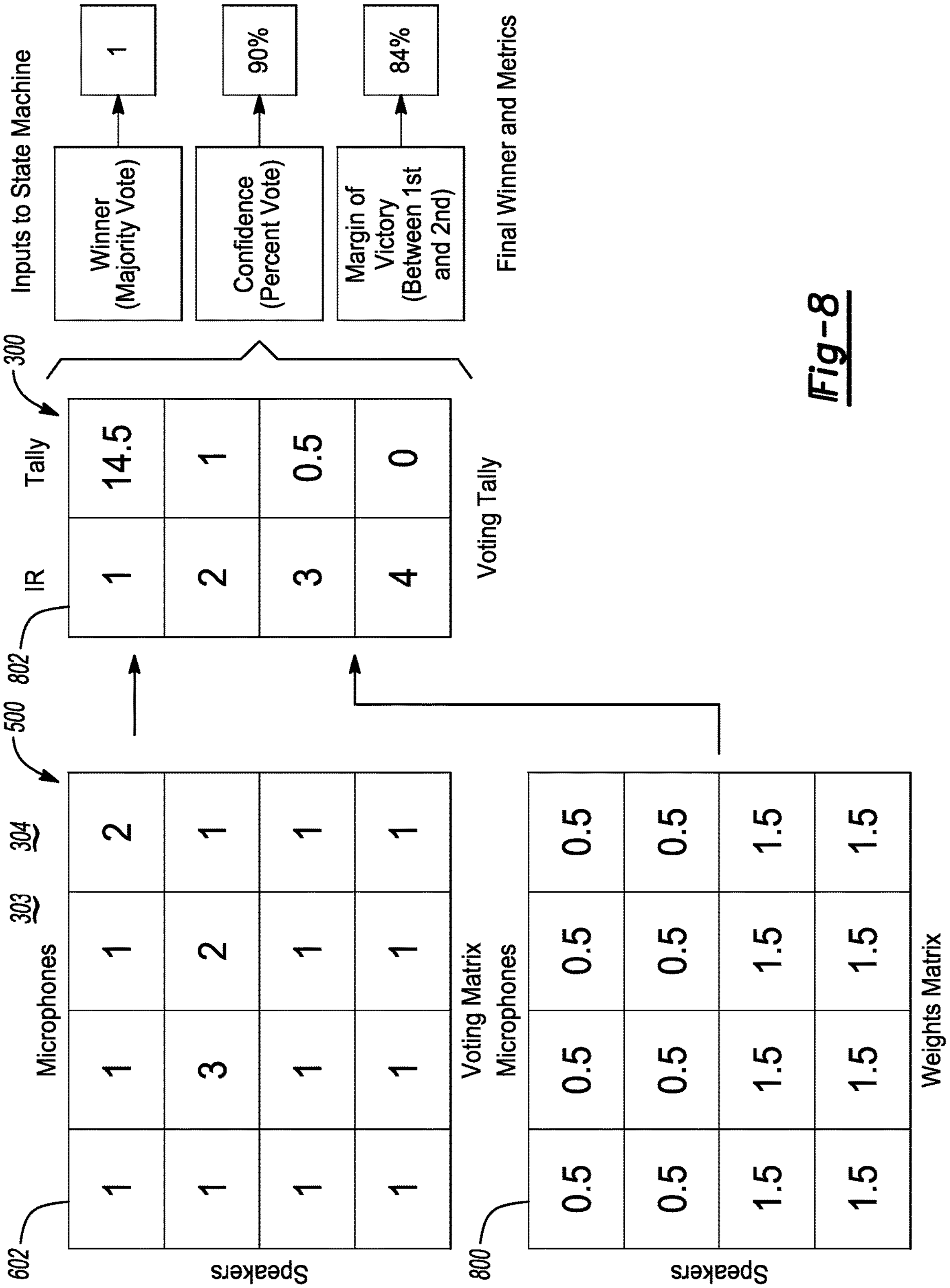
FIG. 8 generally illustrates the example of FIG. 6 where a weighted matrix is applied to select the desired IR as performed by the system of FIGS. 3 and 5.

FIG. 8 generally illustrates the example of FIG. 6 where the controller 303 applies a weighted matrix 800 is applied to select the desired IR as performed by the system of FIGS. 3 and 5. The weighted matrix 800 is multiplied with the to the various IRs as designated by 1, 2, and 3 in the voting matrix 602. The weighted matrix 800 includes values that are weighted at a first value (e.g., 0.5) for various speaker/microphone combinations in the vehicle 313 and values that are weighted at a second value (e.g., 1.5) for various speaker/microphone combinations in the vehicle. The weighted matrix 800 may be used to provide acoustic paths with a higher or lower rate. One example of this application pertains to all stored IRs with changes in the rear seat (or rear row) of the vehicle 313. In this example, the changes in the acoustic path in the front row may be minimal, but the rear cabin's acoustics may change considerably. When the votes are tallied (or added) (see element 802), the votes are biased toward the rear of the vehicle 313. Thus, in this regard, the speaker/microphone combinations in the rear of the vehicle 313 have a vote of 1.5 (e.g., tunable) while the front of the vehicle 313 have a vote of 0.5 (e.g., also tunable). By using the weights matrix, the votes may be biased toward a set of IR paths and aid in increasing the confidence and MOV for specific stored IRs. As noted above, a stored secondary path impulse response $\hat{S}_{pu}(z)$ is a parameter that is measured once during the production tuning process and approximates S(z) for a "nominal" acoustic scenario (i.e., one occupant, windows up, seats in default positions for example). In certain situations, the actual acoustic impulse response S(z) in one of the thousands of production vehicles can vary significantly from the nominal condition measured during tuning in the pre-production vehicle. The acoustic impulse response can vary for many different reasons, like changes in occupancy count, seat position, temperature, and storage (objects placed on the seats). As noted above, matching may be performed via the distance metric as noted above. Other methods of matching (or calculating distance) may involve comparing signals such as comparing spectral characteristics between a current $\hat{S}_{pu}(z)$ value (e.g., the current value of the estimated impulse response that is selected and being used in the system 300) and possible (or future)_candidates of $\hat{S}_{pu}(z)$ values and/or cross correlation between the current $\hat{S}_{pu}(z)$ value (e.g., the current value of the estimated impulse response that is selected and being used in the system 300) and possible (or future) candidates of $\hat{S}_{pu}(z)$ values.

Figure 9:
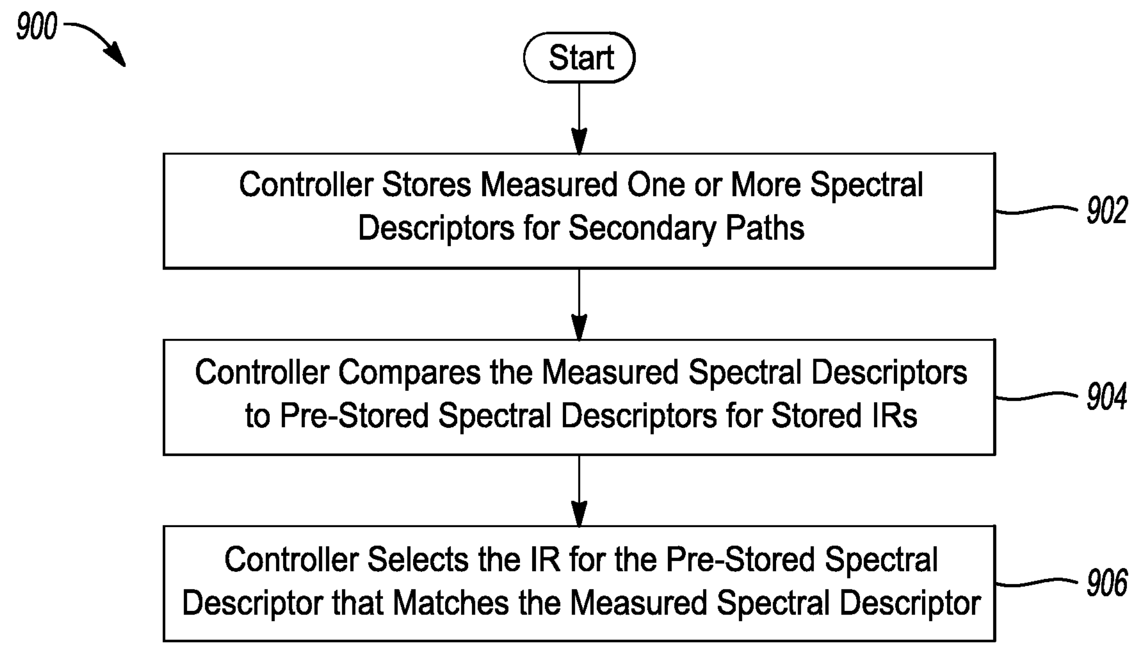
FIG. 9 depicts a method for performing impulse response matching using spectral descriptors in accordance with one embodiment.

FIG. 9 depicts a method 900 for performing impulse response matching using spectral descriptors in accordance with one embodiment. In operation 902, the controller 303 may store measured one or more spectral descriptors for one or more secondary paths. In operation 904, the controller 303 compares the measured spectral descriptors to pre-stored spectral descriptors for the stored IRs. In operation 906, the controller 303 selects the IR for the pre-stored spectral description that matches the measured spectral descriptor. In general, the spectral descriptor may include any one or more of a Spectral Centroid, a Spectral Spread, a Spectral Slope, and a Spectral Skew.

In another embodiment, the controller 303 may measure an absolute difference between each metric and combine all distances into one "averaged" distance. This may be represented by the following equation:

$$\text{Avg (one or more spectral desc}(\hat{S}_{pu}(z)\text{ and stored IRs)}$$

The controller 303 may also apply different weights to each spectral descriptor to bias a final average distance to one or more spectral descriptors.

Figure 10:
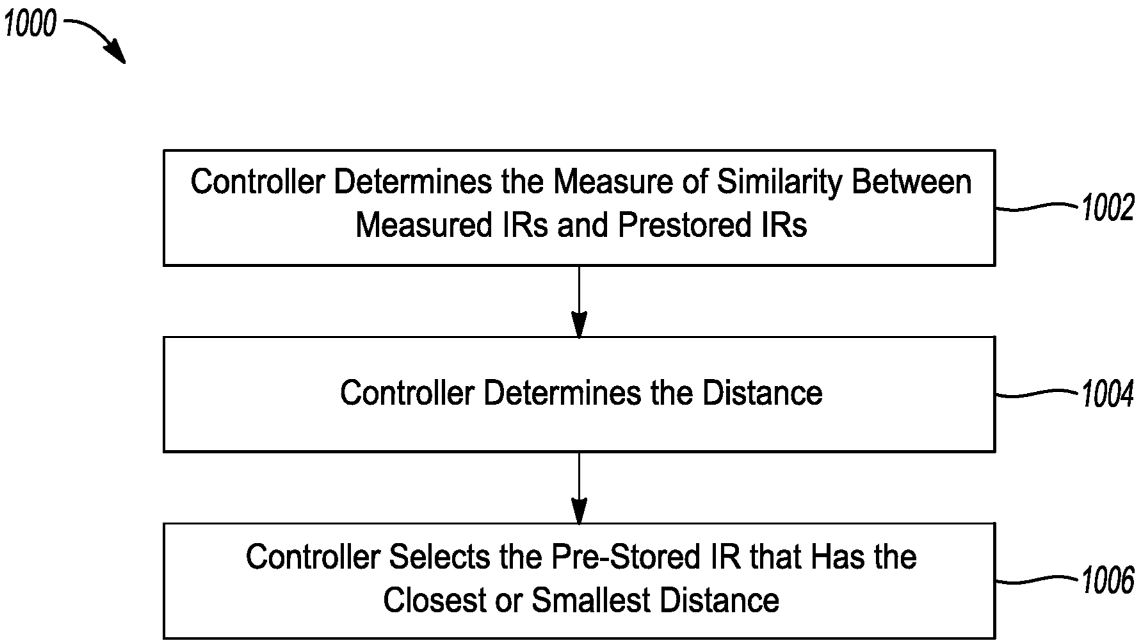
FIG. 10 depicts a method for performing impulse response matching using cross correlation in accordance with one embodiment.

FIG. 10 depicts a method 1000 for performing impulse response matching using cross correlation in accordance with one embodiment. For cross correlation, this corresponds to determining the manner in which two time-series are relative to one another and then locating the displacement (or distance relative to one another). In operation 1002, the controller 303 determines the measure of similarity between measured IRs and prestored IRs. In one example, cross correlation may be simplified into a single scalar value that is also known as the "Pearson Correlation coefficient". The controller 303 determines the Pearson Correlation coefficient. The controller 303 may return a value between −1 and 1.0. In operation 1004, the controller 303 determines the distance. For example, the controller 303 may utilize the Pearson Correlation coefficient (e.g., pearson corr coeff ("pcc")) as follows:

$$\text{Distance}=1-\text{abs}(\text{pcc}(\hat{S}_p,\text{stored } S_p))$$

A small value generated from the equation above corresponds to a small distance. In operation 1006, the controller 303 determines the IR based on the distance. For example, the controller 303 selects the pre-stored IR that exhibits the smallest distance.

In an embodiment, only a portion of the frequency range of the frequency domain IR is to be weighted during the match. For example, the phase or magnitude of the 250 Hz to 300 Hz frequency range is weighted during the match, with the distance of the other frequency ranges not incorporated into the total distance. In another embodiment, only a portion (i.e., less than all) of the time domain response is to be weighted during the matching process.

As also noted above, matching may be performed via the voting logic as noted above. Other methods of matching (or voting) may include utilizing a single distance metric that spans the entire sample of secondary paths S(z) and selecting the $\hat{S}_{pu}(z)$ with the lowest distance. In addition, matching (or voting) may include combinational logic that is based on a comparison of $\hat{S}_{pu}(z)$ and knowledge of likelihood of scenarios in conjunction with additional information about vehicle operation (or based on pre-stored scenarios relative to known outcomes of vehicle situations, operations, or outcomes). For example, this aspect may involve the scenario that if rear seats of the vehicle 313 are occupied, it is less likely that the cargo area is full. In this case, the $\hat{S}_{pu}(z)$ that represents cargo in the rear seat may be less likely to be selected.

These differences lead to large errors on the $\hat{d}_p[n]$ signal and ultimately leads to mis-adjustment or divergence of the ANC adaptive filters W(z). This divergence is perceived by vehicle occupants' as undesirable noise boosting. The aspects disclosed herein seek to mitigate the detrimental effects of secondary path impulse response mismatch.

Another problem that exists in production ANC systems is that the noise cancellation performance tuning typically must be reduced to guarantee stability. Even in nominal cabin conditions, where stability is not a concern, the reduced performance tuning is still applied. The disclosed system and/or method reduces the possibility of instability and divergence by online secondary path estimation and switching. Therefore, this opens the possibility of using more aggressive tuning values for the ANC algorithm. Ultimately, this results in better noise cancellation performance across many more cabin configurations.

Aspects as disclosed herein provide, among other things, cancellation performance that does not need to be sacrificed to achieve stability. A step size (μ) for adaptive filters W(z) 108 do not need to be lowered because the disclosed system may be more stable since $\hat{S}_p(z)$ matches S(z). Aggressive limiters on the anti-noise output need not required to be applied either. There is also the potential to make cancellation performance more consistent when compared to the system used during production tuning with a "nominal" static $\hat{S}_{pu}(z)$ measurement.

An online secondary path estimation and switching algorithm also opens the possibility of using more aggressive tuning values for the ANC algorithm. By mitigating the negative effects of a mismatch between the estimated and actual secondary path impulse responses, the ANC algorithm may be tuned in a more performance focused manner.

As noted above, the disclosed system and method utilizes pre-measured banks of impulse responses. Such a bank of IRs may be measured and tested in pre-production vehicles. In general, banks of IRs may be selected to ensure that common vehicle loading condition that have differences (i.e., differences that could lead to poor performance, unless the IR is updated). In addition, there typically isn't a detrimental effect when changing IRs since W filter*reference that generates the output may still take time to adaptive to the change.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Although FIGS. 1, 3, and 5 show LMS-based adaptive filter controllers 110 and 510, other methods and devices to adapt or create optimal controllable W-filters 108, and 208, and 508 are possible. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers.

For example, the operations recited in any method or process claims may be executed in any order and are not limited to the specific order presented in the claims. Certain operations in any method or process may be omitted without departing from the inventive scope of this application. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing operations can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure.

Although the ANC system is described with reference to a vehicle, the techniques described herein are applicable to non-vehicle applications. For example, a room may have fixed or movable seats which define a listening position at which to quiet a disturbing sound using reference sensors, error sensors, loudspeakers and an LMS adaptive system. Note that the disturbance noise to be cancelled is likely of a different type, such as HVAC noise, or noise from adjacent rooms or spaces. If this listening position varies over time, or if the surroundings vary over time, the techniques and approaches taught herein can be used to determine an updated secondary path to improve the noise cancellation experience.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active noise cancellation (ANC) system comprising:

at least one audio signal source to provide an audio signal in a cabin of a vehicle;

at least one loudspeaker to project anti-noise sound within the cabin of a vehicle in response to receiving an anti-noise signal;

a first microphone to provide a first error signal indicative of noise, the audio signal, and the anti-noise sound within the cabin;

a second microphone to provide a second error signal indicative of an estimated anti-noise signal; and at least one controller programmed to:

receive the first error signal and the second error signal; and provide an estimated impulse response based at least on the first error signal and the second error signal;

compare the estimated impulse response to one or more pre-stored impulse responses;

select a first pre-stored impulse response that matches the estimated impulse response to filter one or more reference signals at an adaptive filter to generate the anti-noise signal; and compare the estimated impulse response to one or more pre-stored impulse responses for one or more loudspeaker and microphone combinations, respectively, in the vehicle.

2. The ANC system of claim 1, wherein the at least one controller is further programmed to generate a distance metric including information for the one or more loudspeaker and microphone combinations in the vehicle.

3. The ANC system of claim 1, wherein the at least one controller is further programmed to:

store the first pre-stored impulse response for the one or more loudspeaker and microphone combinations, and generate a distance metric to determine a closest match between the estimated impulse response and the one or more pre-stored impulse responses for the one or more loudspeaker and microphone combinations.

4. The ANC system of claim 3, wherein the at least one controller is further programmed to select a minimum output for each distance metric.

5. The ANC system of claim 4, wherein the at least one controller is further programmed to provide a vote for each loudspeaker and microphone combination based on the selected minimum output.

6. The ANC system of claim 5, wherein the vote is weighted.

7. The ANC system of claim 5, wherein the at least one controller is further programmed to select the first pre-stored impulse response as matching the estimated impulse response in response to determining that the selected minimum output is associated with the first pre-stored impulse response and the selected minimum output corresponds to a majority of votes.

8. The ANC system of claim 1, wherein the at least one controller is further programmed to determine whether a signal to noise ratio (SNR) of the audio signal is above a predetermined threshold prior to comparing the estimated impulse response to the one or more pre-stored impulse responses.

9. The ANC system of claim 8, wherein the at least one controller is further programmed to determine whether the audio signal exceeds the SNR for a period of time that is greater than a predetermined time interval prior to comparing the estimated impulse response to the one or more pre-stored impulse responses.

10. The ANC system of claim 1 further comprising memory programmed to store the one or more pre-stored impulse responses in a lookup table for comparison to the estimated impulse response.

11. The ANC system of claim 1, wherein the at least one controller is further programmed to select the first pre-stored impulse response that matches the estimated impulse response based on one of: (i) performing a comparison of spectral characteristics between current estimated impulse responses and future candidates of estimated impulse responses and (ii) performing cross-correlation between the current estimated impulse responses and the future candidate of estimated impulse responses.

12. The ANC system of claim 1, wherein the at least one controller is further programmed to select the first pre-stored impulse response that matches the estimated impulse response based on one of: (i) determining a distance metric based on a number of samples of secondary impulse responses and selecting the first pre-stored impulse after selecting the estimated impulse response with a lowest distance, and (ii) a comparison of the estimated impulse response to predetermined scenarios relative to vehicle operation.

13. A method for performing active noise cancellation (ANC) system comprising:

generating an audio signal to transmit in a cabin of a vehicle with at least one audio signal source;

transmitting an anti-noise sound in the cabin of the vehicle via at least one loudspeaker in response to receiving an anti-noise signal;

providing a first error signal indicative of noise, the audio signal, and the anti-noise sound within the cabin and a second error signal indicative of an estimated anti-noise signal;

receiving the first error signal and the second error signal by at least one controller; and providing an estimated impulse response based on the first error signal and the second error signal;

comparing the estimated impulse response to one or more pre-stored impulse responses;

selecting a first pre-stored impulse response that matches the estimated impulse response to filter one or more reference signals at an adaptive filter to generate the anti-noise signal; and comparing the estimated impulse response to one or more pre-stored impulse responses for one or more loudspeaker and microphone combinations in the vehicle.

14. The method of claim 13 further comprising generating a distance metric including information for the one or more loudspeaker and microphone combinations in the vehicle.

15. The method of claim 13 further comprising:

storing the first pre-stored impulse response for the one or more loudspeaker and microphone combinations, and generating a distance metric to determine a closest match between the estimated impulse response and the one or more pre-stored impulse responses for the one or more loudspeaker and microphone combinations.

16. The method of claim 15 further comprising selecting a minimum output for each distance metric.

17. The method of claim 16 further comprising providing a vote for each loudspeaker and microphone combination based on the selected minimum output.

18. The method of claim 17, wherein the vote is weighted.

19. The method of claim 16 further comprising selecting the first pre-stored impulse response as matching the estimated impulse response in response to determining that the selected minimum output is associated with the first pre-stored impulse response and the selected minimum output corresponds to a majority of votes.

20. The method of claim 13 further comprising determining that a signal to noise ratio (SNR) of the audio signal is above a predetermined threshold prior to comparing the estimated impulse response to the one or more pre-stored impulse responses.

21. The method of claim 13 further comprising storing the one or more pre-stored impulse responses in a lookup table for comparison to the estimated impulse response.

22. A computer-program product embodied in a non-transitory computer readable medium that is programmed and executable by one or more controllers for performing active noise cancellation (ANC), the computer-program product comprising instructions for:

generating, an audio signal to transmit in a cabin of a vehicle with at least one audio signal source;

receiving a first error signal indicative of noise, an audio signal, and an anti-noise sound within a cabin of a vehicle;

receiving a second error signal indicative of an estimated anti-noise signal;

receiving the first error signal and the second error signal by at least one controller; and providing an estimated impulse response based on the first error signal and the second error signal;

comparing the estimated impulse response to one or more pre-stored impulse responses;

selecting a first pre-stored impulse response that matches the estimated impulse response to filter one or more reference signals at an adaptive filter to generate an anti-noise signal; and comparing the estimated impulse response to one or more pre-stored impulse responses for one or more loudspeaker and microphone combinations in the vehicle.

* * * * *